United States Patent Office 3,384,443
Patented May 21, 1968

3,384,443
DYEING CELLULOSE AND WOOL FIBERS WITH A POLYETHYLENE GLYCOL ETHER OF A STYRENE-PROPENYLPHENOL COPOLYMER CONTAINING DYE SOLUTION
Joachim Nentwig and Heinrich Krimm, Krefeld-Bockum, Hermann Schnell, Krefeld-Urdingen, and Ludwig Nüssler, Leverkusen, Germany, assignors to Farbenfabriken Bayer Aktiengesellschaft, Leverkusen, Germany, a corporation of Germany
No Drawing. Filed Feb. 4, 1963, Ser. No. 256,119
Claims priority, application Germany, Feb. 5, 1962, F 35,934
4 Claims. (Cl. 8—54)

ABSTRACT OF THE DISCLOSURE

Applicants dye wool and cellulose fibers with a vat dye, an azo dye, a direct dye or metallized azo dyes, each dye being applied to the appropriate type of fiber. The dyes are levelled by polyethylene glycol ether of a propenylphenol and styrene copolymer.

---

The present invention is concerned with a process for the dyeing of textile materials from aqueous dyeing baths. More particularly, it is concerned with a process for the dyeing of wool and cellulose fibers from aqueous dyeing baths in the presence of levelling agents.

It has been known heretofore in the dyeing of textile materials, especially wool and cellulose fibers, to add to the aqueous dyeing baths levelling agents in order to improve the levelling of the dyestuff. As levelling agents there has been proposed certain polyalkylene glycol ethers which are obtained by the reaction of monofunctional alcohols, phenols, carboxylic acids or amines, especially those with more than 10 carbon atoms, and alkylene oxides, especially ethylene oxide.

It is an object of the present invention to provide a process for the dyeing of wool and cellulose fibers from aqueous dyeing baths in the presence of improved levelling agents. According to the present invention, wool and cellulose fibers are dyed from aqueous dyeing baths in the presence of polyalkylene glycol ethers of polyphenols as levelling agents.

The polyalkylene glycol ethers of polyphenols can be prepared by reacting alkylene oxides or alkylene oxides yielding compounds and polymerization products of monomeric phenols containing polymerizable unsaturated groups or copolymerization products thereof with monomeric copolymerizable unsaturated compounds.

Suitable alkylene oxides which can be reacted with the polyphenols are, for example, ethylene oxide, 1,2-propylene oxide, the butylene oxides, styrene oxide, cyclohexene oxide and epichlorohydrine, and alkylene oxide yielding compounds include, e.g., cyclic carbonates of 1,2-diols, such as, of ethylene glycol, propanediol-1,2 and butanediol-1,2, and 1,2-chlorohydrines, such as, 1,2-ethylenechlorohydrine and 1,2-propylenechlorohydrine.

In general, the amount of the alkylene oxides or alkylene oxide yielding compounds which is reacted with the polyphenol is so chosen, that the resulting levelling agent is considerably soluble in the aqueous dyeing baths. Especially the use of ethylene oxide is therefore in general indispensible. The amount of ethylene oxide used depends upon the degree of the hydrophobic properties of the polyphenol applied and can be determined by simple solubility tests. Other alkylene oxides or alkylene oxide yielding compounds can be reacted with the above products in varying amounts. In some cases, by the use of higher alkylene oxides, there can be achieved certain advantages with respect to special properties of the products. Since the incorporation of the higher alkylene oxides, for example, 1,2-propylene oxide, includes hydrophobic properties to the molecule, the amount of these reactants must be so chosen that the water-solubility of the reaction product meets the requirements for their use as levelling agents. If different alkylene oxides are reacted with the polyphenols, products with optimum properties can be prepared by using varying amounts of the reactants and by changing the sequence of the use of the different reactants.

The reaction of the alkylene oxides with the polyphenols is effected at elevated temperatures up to about 100° C. and preferably at elevated pressure and in the presence of basic catalysts such as alkali metal and alkaline earth metal oxides, hydroxides or carbonates or organic amines or quaternary ammonium basis or in the presence of acidic catalysts, such as, Friedel-Kraft's-catalysts, strong water-free mineral acids as known in the art per se.

The polyphenols which can be used for the preparation of the levelling agents described above can be obtained, for example, by the polymerization of suitable monomeric phenols containing polymerizable unsaturated substituents. Phenols of this type are, for example, the monomeric p-isopropenyl phenol or the oligomeric polymerization products thereof, for example, the dimeric p-isopropenyl phenol or the trimeric p-isopropenyl phenol. Other suitable compounds are 1-(p-hydroxyphenyl)-propene-(1), 1-(p-hydroxyphenyl) - butene-(1), 2-(p-hydroxyphenyl)-butene-(2) [p - isobutenylphenol], 1 - (p - hydoxyphenyl)-isobutene-(1), 2-(p-hydroxyphenyl)-pentene-(2), 1-(p-hydroxyphenyl) - cyclohexene-(1) [p-cyclohexenylphenol], 1,1-(p-hydroxydiphenyl)-ethylene, and o-allyl phenol.

In addition, there can also be used monoalkenyl ethers of dihydric phenols, for example, the resorcinol monoallyl ether, and monoesters of polyhydric phenols with unsaturated carboxylic acids, for example, the monoesters of acrylic acid or methacrylic acid with resorcinol, hydroquinone and 2,2-bis-(p-hydroxyphenyl)-propane.

The polymerization of the above mentioned monomeric phenols containing polymerizable unsaturated substituents is effected by the addition of acidic catalysts of the Lewis-type, for example, aluminium chloride, zinc chloride, ferric chloride, tin tetrachloride, boron trifluoride, and strong acids, for example, sulfuric acid, benzene sulfonic acid, p-toluene sulfonic acid, and sulfonated polystyrene. The above catalysts are added to the reactants in an amount from about 0.001 to about 5 percent by weight. The reaction takes place in the temperature range from about 0 to about 250° C., preferably from about 50 to about 200° C. and can be performed, if desired, in the presence of inert solvents for the reactants, for example, benzene, toluene, nitrobenzene and chlorobenzene.

Instead of the homopolymerizates of the above mentioned type there can be used for the preparation of the levelling agents according to the present invention also the copolymerization products of the above mentioned monomeric phenols and suitable unsaturated monomeric copolymerizable compounds which do not contain acidic hydrogen atoms. As such compounds there are to be mentioned, for example, styrene and substituted styrenes, e.g., α-methylstyrene and vinyl toluene, vinyl chloride, vinylidene chloride, esters of vinyl alcohol and carboxylic acids, for example, vinyl acetate, vinyl ketones, e.g., vinyl ethyl ketone, vinyl ethers, for example, vinyl ethyl ether and vinyl phenyl ether, furthermore butadiene, isoprene and chloroprene.

The properties of the levelling agents can be further influenced by using mixtures of different polymerizable compounds and/or mixtures of different phenols containing unsaturated polymerizable substituents.

Another method for the production of the polyalkylene glycol ethers of polyphenols consists in that the above mentioned monomeric phenols containing unsaturated substituents are reacted with the ethylene oxides or ethylene oxide yielding compounds prior to their polymerization and the polymerizable polyethylene glycol ethers of phenols containing unsaturated substituents thus obtained are polymerized or copolymerized as indicated above. The thus obtained products can be used as levelling agents as such or can be further reacted with alkylene oxides and alkylene oxide yielding compounds to produce levelling agents with modified properties.

In general, good levelling effects are obtained if the content of the new levelling agents amounts from about 0.1 to about 10 grams per liter dyeing bath.

The above mentioned levelling agents show, in comparison with the known levelling agents, generally a greatly increased effectiveness. In addition, it is especially surprising that the individual levelling agents according to the present invention are outstandingly suitable at the same time for the dyeing of wool as well as for the dyeing of cellulose fibers whereas the above known levelling agents are effective either in one or on the other case only.

Further advantages of the process of the present invention consist in the low tendency of the dyeing baths containing the above levelling agents to foam formation, in the good thermal stability and in the good stability of the vat, resulting in that no cloud point appears at the usual dyeing temperature. Furthermore, unlevel wool dyeings can be levelled by treating them with a levelling agent according to the present invention. In addition, in the case of the dyeing of wool, the levelling effect can be further increased by the addition of water soluble salts, such as sodium sulfate, sodium chloride and so on.

The dyestuffs which can be used in the process of the present invention are the known dyestuffs for the dyeing of wool and cellulose fibers. Suitable deystuffs are, for example, acidic wool dyestuffs, metal complex dyestuffs, vat dyestuffs, substantive and reactive dystuffs. In particular, as wool dyestuffs there can be used with advantage metal complex dyestuffs which contain less than one atom of a complex-forming metal per mol of a basic dyestuff capable to complex formation, which besides a carboxylic acid group which may participate in the complex formation contains no free acidic water-solubilising groups.

The following examples are given for the purpose of illustrating the present invention:

Example 1

20 grams of wool gabardine are dyed in 1 liter of dye liquor which contains 0.02 gram/liter of the chromium complex compound of 1 atom chromium and 2 mols of the monoazo dyestuff from 4-nitro-2-amino-phenol coupled with 1-methylsulphonylamino-7-hydroxy-naphthalene, 1 cc./liter of 30% acetic acid and 0.2 gram/liter of a copolymerizate from p-isopropenyl-phenol and styrene (hydroxyl number 128) reacted with 43 mols of ethylene oxide per hydroxyl group. The dyeing is commenced at 40-50° C. and the dyebath heated, within 30 minutes, to boiling temperature and boiled for 1 hour. A uniform, olive dyeing is obtained which is considerably more level than a dyeing produced without the previously mentioned levelling agent.

Example 2

20 grams of wool gabardine are dyed in 1 liter of dye liquor which contains 0.025 gram/liter of the cobalt complex compound of 1 atom of cobalt and 2 mols of the monoazo dyestuff from 2-aminophenol-4-sulphamide coupled with 1-(2',5' - dichlorophenyl)-3-methyl - 5 - pyrazolone, 1 cc./liter of 30% acetic acid and 0.2 gram/liter of a copolymerizate from p-isopropenyl-phenol and styrene (hydroxyl number 128) reacted with 43 mols of ethylene oxide per hydroxyl group. Dyeing is commenced at 40-50° C., the dyebath heated within half an hour to boiling temperature and boiled for 30 minutes. The bath is subsequently cooled to about 95° C. and 0.01 gram/liter of the chromium complex compound from 1 atom of chromium and 2 mols of the monoazo dyestuff from 4-ethylsulphonyl-2-amino-phenol coupled with 1-methylsulphonylamino-7-hydroxynaphthalene is added whereupon the bath is boiled for a further half hour. There is obtained a uniform, light-brown dyeing which is considerably more level than a dyeing produced without the levelling agent.

Example 3

Dyeing is carried out as described in Example 2, but the hydroxyalkylated copolymerizate used in Example 2 is replaced by the following products:

(a) A copolymerizate from 1 mol of p-isopropenylphenol, 2 mols of styrene and 1 mol of α-methyl-styrene (hydroxyl number 104), reacted with 35 mols of ethylene oxide per hydroxyl group;

(b) A copolymerizate from 1.5 mols of p-isopropenylphenol, 1 mol of p-cyclohexen-(1)-yl-phenol and 10 mols of styrene (hydroxyl number 116), reacted with 51 mols of ethylene oxide per hydroxyl group;

(c) A copolymerizate from o-allyl-phenol and styrene (hydroxyl number 103), reacted with 35 mols of ethylene oxide per hydroxyl group;

(d) A copolymerizate from p-isopropenylphenol and styrene, reacted with 5 mols of propylene oxide per hydroxyl group and thereafter with 49 mols of ethylene oxide per hydroxyl group.

There are obtained uniform, light-brown dyeings, which are considerably more level than a dyeing produced without the levelling agents.

Example 4

Dyeing is carried out as described in Example 2 but the dyebath contains, from the beginning, an addition of 2 grams/liter of calcined sodium sulfate. There is obtained a light-brown dyeing with outstanding levelness.

Example 5

20 grams of wool gabardine are dyed in 1 liter of a dye liquor which contains 0.02 gram/liter of a dyestuff which is formed by the condensation of 2 mols of 1-amino-4-anilido-anthraquinone-2-sulfonic acid and 1 mol of formaldehyde, 2 grams/liter of calcined sodium sulfate, 0.6 cc./liter of 30% of acetic acid and 0.24 gram/liter of a copolymerizate from p-isopropenylphenol and styrene (hydroxyl number 128) reacted with 43 mols of ethylene oxide per hydroxyl group. Dyeing is commenced at 30-40° C., the dyebath heated to boiling temperature within 30 minutes and boiled for 1 hour. A bright blue dyeing is obtained which is considerably more level than a dyeing produced without the levelling agent.

Example 6

20 grams of wool gabardine are dyed in 1 liter of a dye liquor which contains 0.02 gram/liter of the chromium complex compound of Example 2, 1 cc./liter of 30% acetic acid and 0.24 gram/liter of a copolymerizate from p-isopropenylphenol and styrene (hydroxyl number 119) reacted with 35 mols of ethylene oxide per hydroxyl group. Dyeing is carried out as described in Example 1. There is obtained a uniform, grey dyeing which is considerably more level than an analogous dyeing without the above levelling agent.

Example 7

50 grams of viscous spun rayon yarn are dyed in 1 liter of liquors which contains 0.08 gram/liter of a vat dyestuff (Color Index No. 60010), 5 grams/liter of 85% sodium hydrogen sulfite, 16.5 cc./liter of a sodium hydroxide solution (38° Bé.) and 0.3 gram/liter of a copolymerizate from p-isopropenylphenol and styrene (hydroxyl number 123) reacted with (a) 43 mols and with (b) 100 mols of ethylene oxide per hydroxyl group respectively. The dyeing was carried out in such a manner, that immediately after the vatting and at an interval of ½, 2½ and 10 minutes, 10 grams of the material to be dyed is introduced at 60° C. into the dyebath and treated for a total of 30 minutes.

In the presence of the levelling agents, violet dyeings of practically the same degree of strength are obtained on the strands dyed for different periods of time, while very great differences in the dyeing strength result without the use of the adjuvant.

Example 8

Dyeing is carried out as described in Example 6, but the dyebath contains 0.07 gram/liter of a vat dyestuff (Color Index No. 69025) and 0.06 gram/liter of another vat dyestuff (Color Index No. 59800). In the presence of the levelling agent, there is obtained in practically all strands an equally strong grey dyeing, whereas without the addition of the adjuvant the strands, which were placed in the bath first, are dark blue and the remaining are dyed yellow.

Example 9

50 grams of cuprammonium cellulose yarn are dyed in 1 liter of dye liquors which contains 0.062 gram/liter of a direct dyestuff (Color Index No. 30280), 5 grams/liter of anhydrous sodium sulfate and 0.3 gram/liter of a copolymerizate of p-isopropenylphenol and styrene (hydroxyl number 123), reacted with (a) 43 mols and with (b) 100 mols of ethylene oxide per hydroxyl group respectively. The dyeing was carried out in such a manner, that immediately after the heating of the bath to 90° C. and after 1, 2, 3 and 5 minutes, 10 grams of the material to be dyed are introduced each time and dyed for a total of 20 minutes.

In the presence of the levelling agents, the strands dyed for different lengths of time are practically uniformly and equally dyed, whereas without the addition of the adjuvants there are great differences in the depth of color.

Example 10

50 grams of viscous spun rayon are dyed in 1 liter of a liquor which contains 0.08 gram/liter of a vat dyestuff (Color Index No. 60010), 5 grams/liter of 85% sodium hydrogen sulfite, 16.5 cc./liter of a sodium hydroxide solution (38° Bé.) and only 0.3 gram of the levelling agents used in Example 1, in such a manner that immediately after the vatting and at an interval of ½, 2½ and 10 minutes, 10 grams of the material to be dyed are introduced each time into the dyebath at 60° C. and treated for a total of 30 minutes.

In the presence of the levelling agent, there are obtained practically equally strong dyeings of the strands dyed for different periods of time, whereas without the addition of adjuvant very great differences in the tinctorial strength result.

Example 11

Dyeing is carried out as described in Example 7, but the dyebath contains 0.07 gram/liter of a vat dyestuff (Color Index No. 69025) and 0.06 gram/liter of another vat dyestuff (Color Index No. 59 800).

In the presence of the levelling agent used in Example 2, an equally strong grey dyeing is obtained in practically all strands, whereas without the addition of adjuvant the strands which were placed first in the bath are dyed dark blue and the remainder are dyed yellow.

Example 12

50 grams of cuprammonium silk yarn are dyed in 1 liter of a dye liquor which contains 0.062 gram/liter of a direct dyestuff (Color Index No. 30280), 5 grams/liter of anhydrous sodium sulfate and 0.3 gram/liter of the levelling agent used in Example 1, in such a manner that immediately after heating the bath to 90° C. and after 1, 2, 3 and 5 minutes, 10 grams of the material to be dyed are introduced each time and dyed for a total of 20 minutes.

In the presence of the levelling agent, the strands dyed for different periods of time are dyed practically equally strong and level, whereas without the addition of the adjuvant great differences in depth of color result.

We claim:

1. A process of dyeing wool and cellulose fibers which comprises applying an aqueous dyebath containing a dye and a leveling agent, said leveling agent being a polyethylene glycol ether of a copolymerization product of p-isopropenylphenol and styrene.

2. The process of claim 1 wherein the polyethylene glycol ether is of a copolymerization product of 1 mol of p-isopropenylphenol, 2 mols of styrene and 1 mol of α-methylstyrene.

3. The process of claim 1 wherein the polyethylene glycol ether is of a copolymerization product of 1.5 mols of p-isopropenylphenol, 1.0 mol of p-cyclohexene-(1)-yl-phenol and 10 mols of styrene.

4. A process for dyeing wool and cellulose fibers which comprises applying an aqueous dyebath containing a dye and a dye leveling agent, said dye leveling agent being a polyethylene glycol ether of a copolymerization product of o-allylphenol and styrene.

References Cited

UNITED STATES PATENTS

| | | | |
|---|---|---|---|
| 1,970,578 | 8/1934 | Schoeller | 8—93 |
| 2,560,333 | 7/1951 | DeGroote | 260—47 |
| 2,581,370 | 1/1952 | DeGroote | 260—47 |

OTHER REFERENCES

Speel et al., Textile Chemicals and Auxiliaries, 2nd ed., pp. 365–367, Pub. 1957 by Reinhold Pub. Corp., New York, N.Y.

DONALD LEVY, *Primary Examiner.*

A. LOUIS MONACELL, NORMAN G. TORCHIN,
*Examiners.*